United States Patent [19]
Baca et al.

[11] Patent Number: 5,134,602
[45] Date of Patent: Jul. 28, 1992

[54] CALIBRATING OPTICAL DISK RECORDERS TO SOME PARAMETERS DURING DISK SPIN UP WHILE DEFERRING CALIBRATION OF OTHER PARAMETERS

[75] Inventors: Francisco A. Baca; Alan A. Fennema; Reed A. Hancock; Glen A. Jaquette; Lawrence D. Tipton; Daniel J. Winarski, all of Tucson, Ariz.

[73] Assignee: International Business Machines Corporation, Armonk, N.Y.

[21] Appl. No.: 589,135

[22] Filed: Sep. 27, 1990

[51] Int. Cl.$^5$ .............................................. G11B 7/00
[52] U.S. Cl. .................................. 369/44.27; 369/32; 369/50
[58] Field of Search .................. 369/32, 44.27, 44.28, 369/44.29, 50

[56] References Cited

U.S. PATENT DOCUMENTS

| | | | |
|---|---|---|---|
| 4,656,617 | 4/1987 | Nakatsuyama et al. | 369/50 |
| 4,811,194 | 3/1989 | Tominaya | 369/45 |
| 4,907,212 | 3/1990 | Pharris et al. | 369/45 |

FOREIGN PATENT DOCUMENTS

0371880 11/1989 European Pat. Off. .
3731867 12/1986 Fed. Rep. of Germany .

Primary Examiner—Roy N. Envall, Jr.
Assistant Examiner—Nabil Hindi
Attorney, Agent, or Firm—H. F. Somermeyer

[57] ABSTRACT

This disclosure deals with an optical disk recorder/player (drive) of the type that receives a removable disk for signal exchanging operations. Once a disk is inserted into the drive, the rotation of the disk begins a period of accelerating rotational speed called spin up. During spin up, the focus and tracking systems of the drive are calibrated. Once the disks reach a desired operating rotational speed, a menu is provided for determining when to calibrate a laser in the drive for recording operations. Such writing or recording calibration of the laser occurs at different times in accordance with the types of signal processing functions to be performed with respect to the particular disk. Description includes a media library in which a plurality of optical disk drives are controlled in a manner for minimizing access times to any optical disk within the media library.

21 Claims, 3 Drawing Sheets

CALIBRATING OPTICAL DISK RECORDERS TO SOME PARAMETERS DURING DISK SPIN UP WHILE DEFERRING CALIBRATION OF OTHER PARAMETERS

FIELD OF THE INVENTION

The present invention relates to data disk recorders, particularly to those recorders operable with removable disks and the automatic calibration of the recorder to the inserted disk.

BACKGROUND OF THE INVENTION

It is known that data-storing media are in automatic media libraries such as disk or tape libraries which include data readers and recorders (drives). Library apparatus for storing optical disks as well as other forms of data storing disks are also known in a media library environment. It is desired to reduce the elapsed time from the request for access to an unmounted data disk until the time the data is actually retrieved or recorded on such disk after insertion into a media drive of the library. While the accessing mechanism for transferring a selected disk from its storage compartment or "pigeon hole" to the disk recorder is significant, another significant time delay is the time for the disk to reach operating rotational speed, referred to as "spin up". In optical disks particularly, the optical focusing has to be calibrated to the disk after insertion as well as the tracking circuits and the laser control for recording data onto such an optical disk. Such calibration can also take a substantial amount of time when measured in terms of the electronic speeds. It is desired to provide means and methods for reducing the elapsed time for accessing a record disk inserted into a disk player before signals can be exchanged with such a disk.

DISCUSSION OF THE PRIOR ART

It is known to initialize, i.e. calibrate, focus systems upon power up of an optical disk recorder. Known focusing systems, such as those shown in U.S. Pat. No. 4,446,546 by Miller and U.S. Pat. No. 4,700,056 by Silvy et al., calibrate the focus after the disk has reached operating rotational speed. This arrangement of focus initialization and calibration requires two serially elapsed times before data can be exchanged with the disk. The disk spin up must be complete and the calibration must be complete after the disk has reached its operating speed. It is desired to provide overlap of these operations.

Pharris et al., in U.S. Pat. No. 4,907,212 shows calibration of an optical disk system. Again, calibration occurs only when the optical disk is rotating at its desired operating rotational speed.

SUMMARY OF THE INVENTION

It is an object of the invention to provide enhanced initialization and calibration methods and apparatus which reduce elapsed time for accessing a rotatable data storing disk for desired signal handling and exchanging operations with such disks.

In accordance with the invention, a data disk recorder/player or drive includes means for indicating that a disk has been inserted into such recorder/player. Actuating means start the rotation of the disk for reaching an operating rotation speed. Speed sensing means sense and indicate that the current disk rotational speed has reached such predetermined value less than a desired operating rotational speed and also indicates when the disk rotational speed has reached the operating rotational speed. Calibration means operatively associated with the disk respond to the speed sensing means indicating that the disk rotational speed has reached a predetermined value less than the operating rotational speed to calibrate the recorder/player to the just-inserted disk. Operating means in the recorder/player, responds to the indication that the disk rotational speed has reached the operating rotational speed to conduct data reading and recording operations.

In another aspect of the invention, only the focus and tracking circuits of an optical disk recorder are calibrated during the spin up portion between the predetermined value of the rotational speed and the operating rotational speed. In yet another aspect of the invention, the laser write calibration is selectably deferred after the disk has reached the operating rotational speed. Within this last mentioned aspect, laser write calibration is deferred until after all initial reading from the disk has been completed. A menu of laser write calibration controls is provided. In another aspect of the invention, the disk recorder/players are in a media library environment for enhancing overall operation of the media library.

The foregoing and other objects, features and advantages of the invention will be apparent from the following more particular description of preferred embodiments of the invention, is illustrated in the accompanying drawings.

DETAILED DESCRIPTION OF THE PREFERRED EMBODIMENT

Referring now more particularly to the drawing, like numerals indicate like parts and structural features in the various figures. An optical disk library 10 (FIG. 1) is controlled and operated by control 11. Control 11 can be a media library controller of known design. A plurality of optical disk recorder/players, hereinafter drives 12-15, are spaced throughout the array of disk storage slots 16 (two of which are shown) within library 10. Library 10 is constructed as an open faced wall of storage slots 16 which receive optical disk media, preferably in a cartridge. Transport of the media library 10 contained optical disks between the drives 12-15 and the storage slots 16 is by a traveling elevator or accessor 17. Accessor 17 moves along the face of the open wall of media library 10 and has a movable cartridge carrier 18 for removing and inserting cartridges containing optical disks to and from the storage slots 16 and drives 12-15. Control 11 controls all four of the drives 12-15 and accessor 17. Of course, any number of drives may be used in the media library, such numerical selection is application dependent. Control 11 is connected to a host processor (not shown) over line 202. A host processor requests, via line 202 that a given disk residing in one of the storage bins 16 be accessed. Control 11 identifies the library location of such a disk and a next available drive 12-15. Accessor 17 is then actuated for moving the desired disk from its assigned storage slot 16 to a drive 12-15 allocated for performing the upcoming data processing operations.

Figure 1:
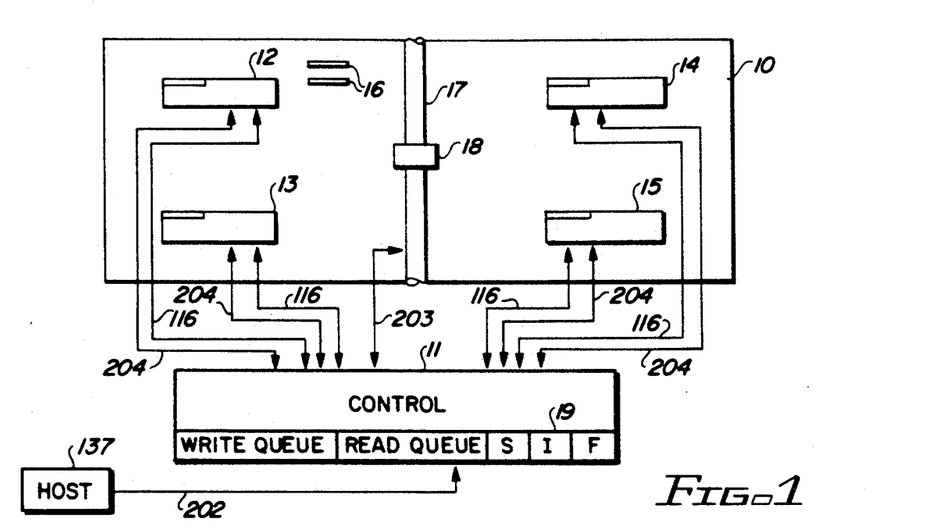
FIG. 1 is a simplified diagram showing a media library employing the teachings of the present invention.

For facilitating efficiency of media library 10, a host processor can give an intent signal to control 11 indicating the type of disk it wants and the type of ensuing data processing operations. A register 19 within control 11 stores such indications for each of the optical disks to be inserted or currently inserted into drives 12-15. Such indications may also be recorded on the disk itself such that control 11 can ascertain the character of the ensuing operations, as will become apparent. In the illustrated embodiment, three classes of operations are used for selecting a later described laser write calibration. Such classes are F, I and S shown in register 19, one entry for each of the mounted disk or disks to be mounted in a drive. F indicates that the operations are file folder management, i.e. usual data processing operations. I is a class of image processing operations. S indicates that the disk is a scratch disk i.e., no signal recording thereon. It is parenthetically noted that a scratch disk may already be formatted for enabling data processing operations or may require formatting before data processing or other signal exchange in operations can occur with such a disk.

Figure 2:
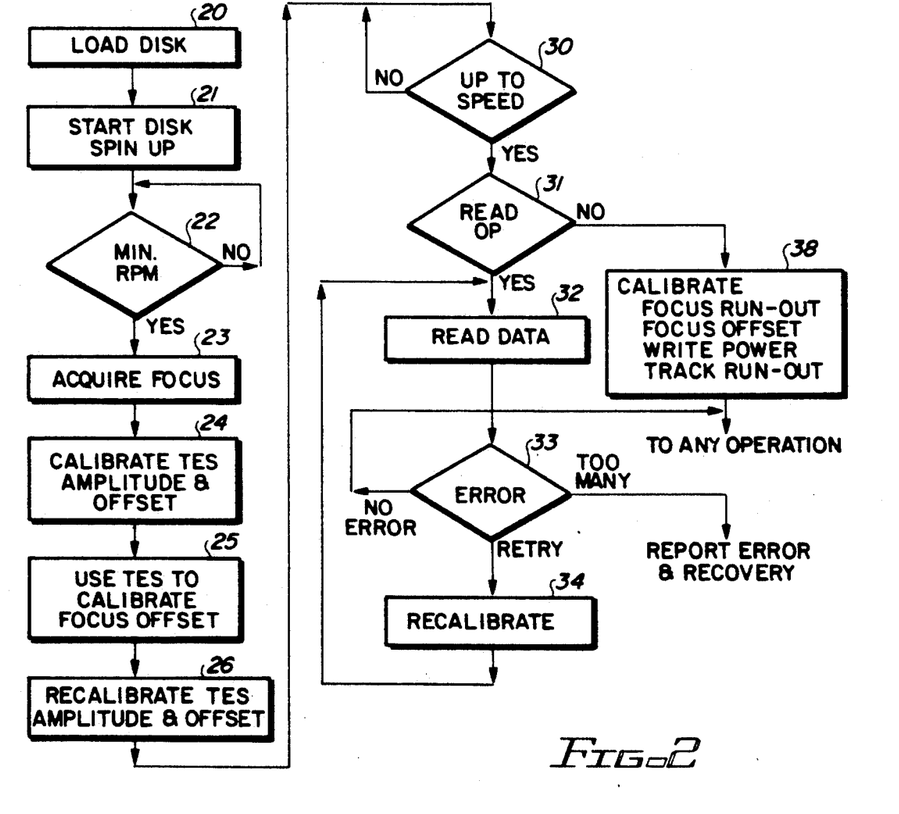
FIG. 2 is a simplified machine operations flow chart showing the operations of the FIG. 1 illustrated apparatus when practicing the present invention.
Figure 5:
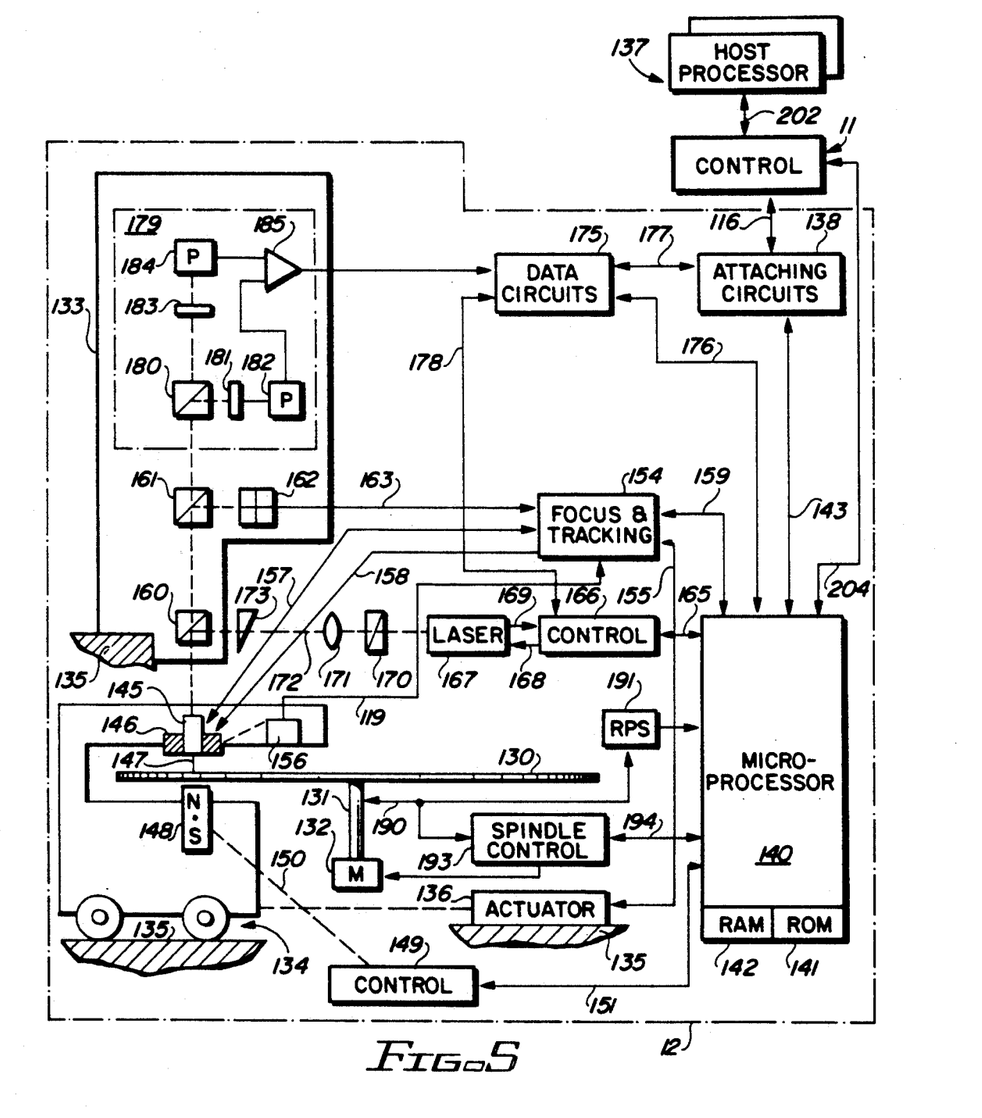
FIG. 5 is a simplified block diagram of an optical disk recorder in which the present invention is advantageously employed.

Referring now more particularly to FIG. 2, machine operations effected by control 11 will now be discussed. In practicing the present invention, when a single optical disk is inserted into a one of the drives 12-15 is described. At machine step 20, a selected optical disk is loaded into one of the drives using the usual media library control. At machine step 21 the drive receiving the disk starts rotating the disk using its internal motor 132 as seen in FIG. 5. Microprocessor 140, in a known manner, monitors the rotational speed of the loaded disk in the assigned drive. The allocated drive 12-15 for the ensuing operations supplies tachometer signals to microprocessor 140 from RPS 191. Microprocessor 140 calculates rotational speed based on such tachometer signals.

It is known that activating a laser to shine its beam onto a stationary or non-rotating optical disk can damage the recording surface of such a disk, such as in a magnetooptic disk. It is desired to preserve the recording surface of the disk, therefore, a minimum rotational speed is required before laser actuation for focus and other calibrations can occur on any mounted optical disk. Microprocessor 140, as to the just loaded disk, idles at step 22 calculating the rotational speed of the disk until the minimum rotational speed (RPM—rotations per minute) is reached. When the just-mounted disk reaches a safe rotational speed less than the desired operating rotational speed, the allocated drive 12-15 at step 23 turns on its laser and acquires focus using the normal focus initialization and acquisition techniques even though the loaded or inserted disks have not yet reached operating rotational speed. Once a focus is obtained, then the laser beam is moved to a data recording area of the disk (calibration areas are not shown) for calibrating (step 24) the amplitude and off-set of the tracking error signal (TES). This TES, which is the position error with respect to the track, is used in the track following and track seeking circuits. Next there may be a focus off-set which is then calibrated at step 25 using the TES. There may be a recalibration of the TES as shown in step 26. Such calibration time it has been found takes less time than to complete the spin up to operating rotational speed of the just inserted or loaded disk. At machine step 30, microprocessor 140 does not pursue further calibration until the loaded disk is up to the desired or operating rotational speed. When the disk has reached the operating speed, then at machine step 31, microprocessor 140 determines the type of operation requested by the host processor which caused the loading of the disk to the drive of media library 10. It is parenthetically noted that control 11 may load a scratch disk on its own, independent of any connected host processor command for a formatting change during idle times of any of the drives 12-15. In any event, at step 31, which is expanded in FIG. 3 for accommodating a menu of controls, microprocessor 140 ascertains whether or not a read operation (OP) has been requested. Generally, the insertion of a disk into a drive first results in a read operation even if just for host requested verification that the just-mounted disk is the desired disk. Note that control 11 may identify the disk independently of host processor 137. Such verification in the present embodiment is not a host-requested read operation. When a read operation is indicated at machine step 31, then the data is read at machine step 32. At machine step 33, microprocessor 140 checks for errors in the data just read. If no errors are detected, then machine operations for accessing the disk ensue. If a read error occurs and the retry procedures have not been exhausted, then at machine step 34 the recorder/player is calibrated for again attempting to read the data. Step 34 in FIG. 2 is equivalent to steps 23-26. Such recalibration can involve recalibrating the focus, the track following, laser power and the like. Then machine step 32 is reexecuted for reading the data. If, however, the data is still in error and the retry procedures have been exhausted, i.e., too many retrys, then the error is recorded and recovery procedures beyond the scope of the present description are effected.

Returning now to machine step 31, if there is no read operation queued or pending from the host processor then microprocessor 140 effects machine step 38 for calibrating the focus run out, the focus off-set, laser write power is calibrated and then track following run out is calibrated. Then machine operations proceed to the usual operations of a recorder/player employing record storage disks.

Figure 3:
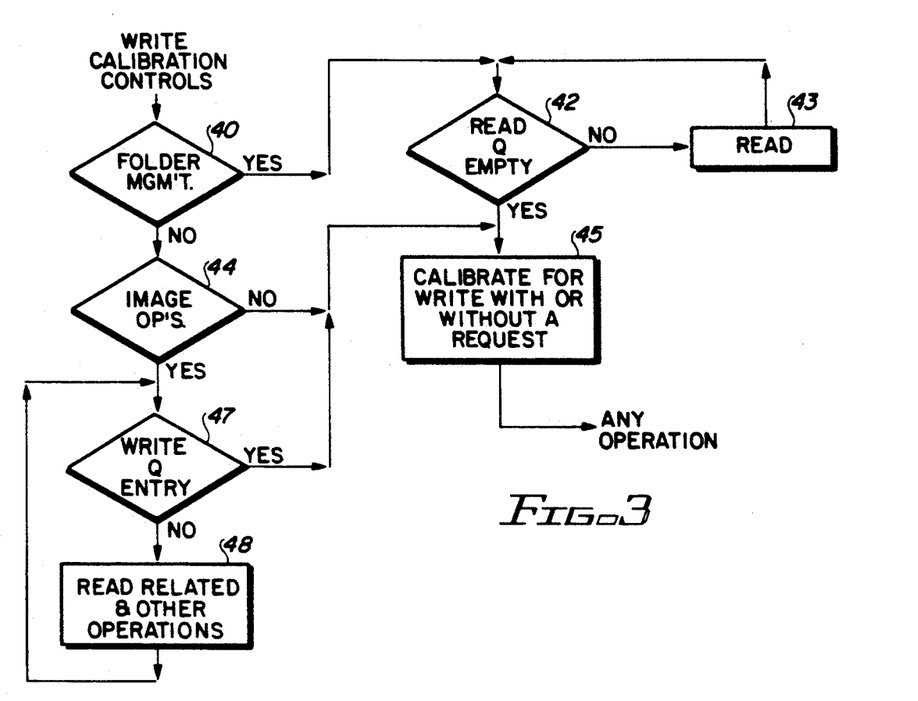
FIG. 3 is a simplified machine operations flow chart showing write calibration controls employing a menu of such controls.

FIG. 3 shows a menu of controls for calibrating a laser for recording operation. When these are no read errors, this menu replaces steps 31, 32 and 38 of FIG. 2. At machine step 40, control 11 examines register 19 to see if the ensuing data processing operations for the just inserted optical disk is for folder management (MGM'T). If folder management is indicated by the F indicator of register 19, then at machine step 42 control 11 examines the queue of host processor requested read operations in the register 19 portion for the current drive 12-15 which receive the inserted disk. If the read queue is not empty, then of course host processor requested reading ensues as indicated by machine step 43. Such reading occurs until the read queue is in fact empty. As soon as the read queue is empty then at machine step 45 the recorder is calibrated for writing or recording with or without a write request. Machine step 45 is similar to machine step 38 of FIG. 2. Upon completing machine step 45, reading, erasing and recording operations can ensue as indicated by "any operation".

If at machine step 40, folder management is not the indicated ensuing data processing operation, then at machine step 44, control 11 determines whether or not image operations (OP's) have been indicated by the I indicator of register 19 for the current drive. If yes, then machine step 47 is executed. In this instance, laser write calibration is deferred until a host processor write request is received At machine step 47, the write queue (Q) of requester 19 for the current drive is examined. If there is an entry in the write queue for the current drive, then step 45 is performed in preparation for writing an image onto the just inserted optical disk. If, on the other hand, the write queue is empty (the "no" exit of step 47) then read related and other operations are performed in machine step 48. Machine operations repeatedly returns to machine step 47 as long as the image containing optical disk resides in the current drive and the write queue is empty. It is to be understood that the machine operations set forth in FIG. 3 are exited when the image storing optical disk is removed from the current drive.

Returning now to machine step 44, if an image operation is not indicated, then by default, the disk is a scratch disk indicated by the S in register 19 for the current drive. For a scratch disk to be used, write calibration is first required and machine step 45 is then performed.

Figure 4:
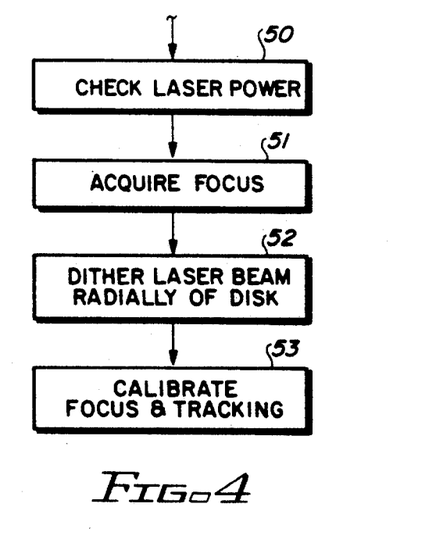
FIG. 4 is a simplified machine operations flow chart showing a sequence of calibrating an optical disk recorder during disk spin up.

FIG. 4 is a machine operations chart showing, in simplified form, a sequence of machine operations for focus and calibration during disk spin up as performed in steps 23-25 of FIG. 2. At machine step 50 of FIG. 4, the laser power is checked to ensure that it is not excessive yet sufficient for acquiring the focus. At this time, the laser beam is moved onto the disk as explained later with respect to FIG. 5, either to a laser calibration area, as is known, or to a mirror or grooved area, also as is known. At machine step 51, the focus condition is actually acquired i.e., the objective lens shown in FIG. 5 is moved to an in-focus position for focusing a laser beam onto the disk. After focus is acquired at machine step 52 a laser beam is moved onto a grooved area of the disk and is dithered radially by dithering fine actuator 146 for enabling calibrating the tracking system at step 53. The track crossing rate of the dithering is between 2 KHZ and 10 KHZ, with 6 KHZ the typical rate. A plurality of areas of the disk may be chosen for such dithering. Currently, five areas of the disk are chosen. In order to get the average calibration of the disk, the high and low values are discarded and the average calculated from the remaining three values.

As to the last two described steps, if the laser beam were held at a stationary radial position relative to a partially spun up disk, an accurate calibration cannot be achieved because of the insufficient rotational speed of the disk during spin up. When a formatted disk, such as a magnetooptic disk, is still being accelerated toward an operating rotational speed, dithering the beam radially simulates track crossings i.e., crossing the grooves and land areas of the disk. All of the above described machine operations occur when any optical disk is inserted into any one of the drives 12-15. It is to be appreciated that these machine operations can be overlapped with respect to one drive or another, therefore, the lines of FIG. 1 extending from control 11 to the respective drives 12-15 not only represent the electrical connections between the control and the respective drives, but also the independent and interleaved machine operations as shown and described for FIGS. 2-4 above. In addition to all of the above, the disks may contain control information which is readable by microprocessor 140 through one of the drives 12-15 for use in initializing and calibrating that particular disk. Such details are beyond the present description.

An optical recorder with which the present invention may be advantageously employed is shown in FIG. 5. A removable magnetooptic record disk 130 is removably mounted for rotation on spindle 131 by motor 132. Optical head-carrying carriage generally denoted by numeral 134 moves radially of disk 130. A frame 135 of recorder suitably mounts carriage 134 for reciprocating radial motions. The radial motions of carriage 134 enable access to any one of a plurality of concentric tracks or circumvolutions of a spiral track for recording and recovering data on and from the disk. Linear actuator 136 suitably mounted on frame 135, radially moves carriage 134 for enabling track accessing. The recorder is suitably attached via cable or bus 116 to one or more host processors 137, such host processors may be control units, personal computers, large system computers, communication systems, image signal processors, and the like. Attaching circuits 138 provide the logical and electrical connections between the optical recorder and the control 11.

Microprocessor 140 controls the recorder. Control data, status data, commands and the like are exchanged between attaching circuits 138 and microprocessor 140 via bidirectional bus 143. Included in microprocessor 140 is a program or microcode-storing, read-only memory (ROM) 141 and a data and control signal storing random-access memory (RAM) 142. The machine operations shown in FIGS. 2 and 4 are controlled, in part, under automatic supervision of microprocessor 140.

The optics of the recorder include an objective or focusing lens 145 mounted for focusing and radial tracking motions on carriage 134 via fine actuator 146. This fine actuator includes mechanisms for moving lens 145 toward and away from disk 130 for focusing and for radial movements parallel to carriage 134 motions; for example, for changing tracks within a small range of tracks typically 100, so that carriage 13 need not be actuated each time a track adjacent to a track currently being accessed is to be accessed. Numeral 147 denotes a two-way light path between lens 145 and disk 130.

In magnetooptic recording, magnet 148 (magnet 148 can be either an electromagnet or permanent magnet) provides a weak magnetic steering or bias field for directing the remnant magnetization direction of a small spot on disk 130 illuminated by laser light from lens 145. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 148 to direct the remnant magnetization to a desired direction of magnetization as the spot cools below the Curie point temperature Magnet 148 is shown as oriented in the "write" direction, i.e., binary ones recorded on disk 130 normally are "north pole remnant magnetization". To erase disk 130, magnet 148 rotates so the south pole is adjacent disk 130. Magnet control 149, which is operatively coupled to rotatable magnet 148 as indicated by dashed line 150, controls the write and erase directions. Microprocessor 140 supplies control signals over line 151 to control 149 for effecting reversal of the magnetic steering field. It is necessary to control the radial position of the beam following path 147 such that a track or circumvolution is faithfully followed and that a desired track or circumvolution is quickly and precisely accessed. To this end, focus and tracking circuits 154 control both the coarse actuator 136 and fine actuator 146. The positioning of carriage 134 by actuator 136 is precisely controlled by control signals supplied by circuits 154 and microprocessor 140 over lines 155 and 159 to actuator 136. Additionally, the fine actuator 146 control by circuits 154 is exercised through control signals travelling to fine actuator 146 over lines 157 and 158, respectively for effecting respective focus and track following and seeking actions. Sensor 156 senses the relative position of fine actuator 146 to headarm carriage 134 to create a relative position error (RPE) signal 119. This signal goes to circuits 154. Line 157 consists of a conductor for carrying focus error signals from circuits 154 to the focus mechanisms in fine actuator 146.

The focus and tracking position sensing is achieved by analyzing laser light reflected from disk 130 over path 147, thence through lens 145, through one-half mirror 160 to be reflected by half-mirror 161 to a so-called "quad detector" 162. Quad detector 162 has four photoelements which respectively supply signals on four lines collectively denominated by numeral 163 to focus and tracking circuits 154. Aligning one axis of the detector 162 with a track center line, track following operations are enabled. Focus and tracking circuits 154 analyze the signals on lines 163 to control both focus and tracking.

Recording of writing data onto disk 130 is next described. It is assumed that magnet 148 is rotated to the desired position for recording data. Microprocessor 140 supplies a control signal over line 165 to laser control 166 for indicating that a recording operation is to ensue. This means that laser 167 is energized by control 166 to emit a high-intensity laser light beam for recording; in contrast, for reading the laser 167 emitted laser light beam is at a reduced intensity for not heating the laser illuminated spot on disk 130 above the Curie point. Control 166 supplies its control signal over line 168 to laser 167 and receives a feedback signal over line 169 indicating the laser 167 emitted light intensity. Control 166 adjusts the light intensity to the desired value. Laser 167, a semiconductor laser, such as a gallium-arsenide diode laser, can be modulated by data signals so the emitted light beam represents the data to be recorded by intensity modulation. In this regard, data circuits 175 supply data indicating signals over line 178 to laser control 166 for effecting such modulation. This modulated light beam passes through polarizer 170 (linearly polarizing the beam), thence through collimating lens 171. This collimated beam 172 is directed through circularizing optical element 173 to change the laser beam from an elliptical to a circular profile. Then the beam strikes half mirror 160 for being reflected toward disk 130 through lens 145. Data circuits 175 are prepared for recording by the microprocessor 140 supplying suitable control signals over line 176. Microprocessor 140 in preparing circuits 175 is responding to commands for recording received from a host processor 137 via attaching circuits 138 and control 11. Once data circuits 175 are prepared, data is transferred between host processor 137 and data circuits 175 through attaching circuits 138 and control 11. Data circuits 175, also ancillary circuits (not shown), relating to disk 130 format records and performs error detection and correction and the like. Data circuits 175, during a read or recovery action, strip the ancillary signals from the readback signals before supplying corrected data signals over bus 177 to host processor 137 via attaching circuits 138 and control 11.

Reading or recovering data from disk 130 for transmission to a host processor requires optical and electrical processing of the laser light beam from the disk 130. That portion of the reflected light (which has its linear polarization from polarizer 170 rotated by disk 130 recording using the Kerr effect) travels along the two-way light path 147, through lens 145 and half-mirrors 160 and 161 to the data detection portion 179 of the headarm 133 optics. Optical element 180 includes a polarization dependent element which processes the polarization state of the reflected beam. When the reflected beam has no Kerr rotation, optical element 180 included polarization dependent element (not separately shown) balances the beam intensity equally between two orthogonal polarization states. The reflected beam then travels into polarizing beam splitter 180 which divides the beam into two beams which have the relative intensities of the two orthogonal polarization states coming in. Lenses 181 and 183 respectively focus the two beams onto the two photo-detectors 182 and 184. Differential amplifier 185 senses the difference between the two photodetector supplied signals. When the remanent magnetization on disk 130 spot being accessed has a "north" or binary one indication the polarization of the reflected beam is rotated. This "north" rotated reflected beam is then processed by optical element 181. The rotation of the incoming beam results in the intensity of the beam in the first polarization state being increased and the intensity of the beam in the second polarization state being decreased. The intensity of the light falling on the photo-detector 182 is increased; the intensity of the light falling on the photo-detector 184 is decreased. A "south" rotated reflected beam gives the opposite effect—the intensity in the first polarization state and onto photo-detector 182 is decreased and the intensity in the second polarization state and onto photo-detector 184 is increased. Amplifier 185 creates a signal representing the polarization rotation of the reflected beam by amplifying the difference between the intensity of the light falling on photo-detectors 182 and 184. The amplifier 185 supplies the resulting difference or data representing signal to data circuits 175 for detection. The detected signals include not only data that is recorded but also all of the so-called ancillary signals as well. The term "data" as used herein is intended to include any and all information-bearing signals, preferably of the digital or discrete value type. The rotational position and rotational speed of spindle 131 is sensed by a suitable tachometer or emitter sensor 190. Sensor 190 can be on any sensing system such as a head effect system or optical-sensing type that senses dark and light spots on a tachometer wheel (not shown) of spindle 131, etc. Sensor 190 supplies the "tach" signals (digital signals) to RPS circuit 191 which detects the rotational position of spindle 131 and supplies rotational information-bearing signals to microprocessor 140. Microprocessor 140 employs such rotational signals for controlling access to data storing segments on disk 130 as is widely practiced in the magnetic data storing disks. Additionally, the sensor 190 signals also travel to spindle speed control circuits 193 for controlling motor 132 to rotate spindle 131 at a constant rotational speed. Control 193 may include a crystal-controlled oscillator for controlling motor 132 speed, as is well known. Microprocessor 140 supplies control signals over line 194 to control 193 in the usual manner.

Line 204 is used to better control load and unload operations by interfacing directly with control 11 rather than using attaching circuits 138.

While the invention has been particularly shown and described with reference to preferred embodiments thereof, it will be understood by those skilled in the art that various changes in form and details may be made therein without departing from the spirit and scope of the invention:

What is claimed is:

1. In apparatus for operating a disk recorder which is operative with removable data storing disks, including, in combination:
    means for indicating that a disk has been inserted into the recorder;
    actuating means connected to the indicating means for starting the rotation of the disk toward an operating rotational speed;
    speed sensing means connected to the actuating means for sensing and indicating that the disk rotational speed has reached a predetermined value less than said operating rotational speed and indicating when the disk rotational speed has reached said operating rotational speed;
    calibration means connected to the speed sensing means and operatively connected to the disk for calibrating the operation of the recorder to the disk after the disk rotational speed reaches said predetermine value and before the disk rotational speed reaches said operating rotational speed and for indicating said calibration has been completed; and
    operating means in the recorder connected to the speed sensing means and to the calibration means for responding to said speed sensing means indicating said operating rotational speed and to said calibration means indicating completion of said calibration for operating the disk recorder after the disk rotational speed reaches said operating rotational speed.

2. In the apparatus set forth in claim 1 further including, in combination:
    said recorder being an optical disk recorder having an optical system including a light source for directing a light beam onto a disk inserted into the recorder and for intercepting reflection of the light beam from the inserted disk, including a focussing portion and a beam tracking and seeking portion; and
    said calibration means including a focus calibration portion for calibrating the focusing portion of the optical system to be in focus at the recording surface of said disk.

3. In the apparatus set forth in claim 2 further including, in combination:
    said calibration means including a tracking calibration portion for calibrating the tracking and seeking portion for tracking a center line of tracks being scanned; and
    said calibration means actuating the tracking calibration portion after actuating said focus calibration portion but before the disk rotational speed reaches said operating rotational speed.

4. In the apparatus set forth in claim 3 further including, in combination:
    said calibration means including a write power calibration portion for calibrating the laser to emit a laser beam at a predetermined power level for recording data on the inserted disk and actuating the write power calibration portion after the inserted disk is rotating a the operating rotational speed and for completing the laser calibration before recording any data on the inserted disk.

5. In the apparatus set forth in claim 4 further including, in combination:
    control means in the recorder connected to the calibration means for actuating the write power calibration and being operative to actuate the calibration means at any one of a plurality of elapsed times after the inserted disk is rotating at the operating rotational speed for a first write power calibration of said laser for recording data on said inserted disk.

6. In the apparatus set forth in claim 5 further including, in combination:
    said control means including upcoming operation indication means for indicating which class of a plurality of classes of operations on said inserted disk that are to ensue;
    means in the control means indicating a predetermined condition precedent in each of said respective classes that are to be respectively met before calibrating said laser for emitting the light beam to record data on the inserted disk; and
    said control means selecting said one of the plurality of classes including its respective condition precedent as a means for determining said one elapsed time.

7. In the apparatus set forth in claim 5 further including, in combination:
    said control means having upcoming operation indicating means capable of indicating folder, image and scratch classes of upcoming operations;
    said control means actuating the calibration means to perform said write power calibration for folder operations only after performing a predetermined a read operation, actuating the calibration means to perform said write power calibration for image operations only before a first writing or recording operation and for scratch operations as a first machine operation after the disk has reached said operating rotational speed, said folder class indicating that said upcoming operations are file folder management in which one or more data records are read from or recorded onto said inserted disk, said image class indicating that said upcoming operations of image processing operations and said scratch class indicates that said upcoming operations involve no data processing operations and involve only disk formatting and initializing operations.

8. In apparatus for storing data on a plurality of data-storing disks, including, in combination:
    a media library having a multiplicity of addressable disk storage slots, accessing means to move any one of said disks from any of said disk storage slots, respectively, to a disk recorder and to return the disk to a one of said disk storage slots;
    a plurality of said disk recorders installed in said media library adjacent predetermined ones of said disk storage slots and respectively having an addressable disk ingress-egress port for receiving and ejecting any of said disks from and to said accessing means for performing data operations on disks that were respectively stored in said addressable disk storage slots and transported by said accessing means to said port;

each of said plurality of disk recorders having:
means for indicating that a disk has been inserted into the recorder via said port;
each of said plurality of disk recorders having actuating means connected to the indicating means for automatically starting the rotation of the inserted disk toward an operating rotational speed;
each of said plurality of disk recorders having speed sensing means connected to the actuating means of such each disk recorder for sensing and indicating that the inserted disk rotational speed has reached a predetermined value less than said operating rotational speed and indicating when the inserted disk rotational speed has reached said operating rotational speed;
each of said plurality of disk recorders having calibration means connected to the speed sensing means of said each disk recorder and operatively connected to the inserted disk for calibrating the operation of the recorder to the inserted disk after the inserted disk rotational speed reaches said predetermine value and before the inserted disk rotational speed reaches said operating rotational speed and for indicating said calibration has been completed; and
operating means in each of said plurality of disk recorders connected to the speed sensing means and to the calibration means of said each disk recorder for responding to said speed sensing means indicating said operating rotational speed and to said calibration means indicating completion of said calibration for operating the disk recorder after the disk rotational speed reaches said operating rotational speed.

9. In the apparatus set forth in claim 8 wherein said calibration means in each of said plurality of disk recorders is non-responsive to said indicated predetermined value of disk rotational speed until actuated to be responsive thereto, further including, in combination:
library control means connected to each of said plurality of disk recorders for actuating the respective said calibration means to respond to said indicated predetermined value of disk rotational speed for calibrating said recorder to said received disk.

10. In the apparatus set forth in claim 9 further including, in combination:
each of said plurality of disk recorders being an optical disk recorder having an optical system including a light source for directing a light beam onto an optical disk inserted into the recorder and for intercepting reflection of the light beam from the inserted optical disk, said optical disk recording including a focussing portion and a beam tracking and seeking portion; and
said calibration means in each of said optical disk recorders including a focus calibration portion for calibrating the focusing portion of the optical system for focussing said light beam at said optical disk.

11. In the apparatus set forth in claim 10 further including, in combination:
each of said optical disk recorders respective calibration means including a tracking calibration portion for calibrating the tracking and seeking portion of the respective recorders for tracking a center line of a data-storing track on said inserted optical disk; and
each said calibration means actuating the tracking calibration portion in said each optical disk recorder after actuating said focus calibration portion and before the rotational speed of said inserted optical disk reaches said operating rotational speed.

12. In a machine-effected method of operating a disk drive having means for removably receiving a signal storage disk, including the machine-executed steps of:
indicating that a disk has been inserted into the disk drive and beginning to rotate the inserted disk within the drive toward an operating rotational speed; and
detecting when the inserted disk is rotating at a predetermined minimum rotational speed and is still accelerating toward said operating rotational speed, then begin calibrating the disk drive to operate with said inserted disk before the disk rotational speed reaches said operating rotational speed.

13. In the machine-effected method set forth in claim 12 further including the machine-executed steps of:
selecting said disk drive to be an optical disk drive and inserting an optical disk into the drive;
during said calibrating the disk drive step before said inserted disk rotation reaches said operating rotational speed, first acquiring the focus of the optical disk drive, second, calibrating the tracking of the optical disk drive, then third, completing the focus calibration, and fourth, after completing the focus calibration, then again calibrating the tracking of the optical disk drive.

14. In the machine-effected method set forth in claim 13 further including the machine-executed steps of:
detecting when the inserted disk is rotating at the operating rotational speed and then calibrating the optical disk drive for recording signals onto the inserted disk.

15. In the machine-effected method set forth in claim 14 further including the machine-executed steps of:
indicating that the inserted disk is to be used for folder data processing operations which employ records of data;
reading a predetermined number of said records, then calibrating the optical disk drive for recording operations.

16. In the machine-effected method set forth in claim 14 further including the machine-executed steps of:
indicating that the inserted disk is to be used for folder data processing operations which employ records of data;
reading records from the inserted disk and detecting when there are no more records to be immediately read from the inserted disk, then calibrating the optical disk drive for recording operations.

17. In the machine-effected method set forth in claim 14 further including the machine-executed steps of:
indicating that the inserted disk is to be used for image data operations;
detecting that a recording operation is to be performed as a part of the image data operations; and
calibrating the write power only after detecting that a recording operation is to be performed.

18. In a machine-effected method of operating a media library which employs signal-storing disks and has a plurality of disk drives in the library for exchanging signals with a disk inserted into such drive by the media library, including the machine-executed steps of:
  inserting a disk into one of the disk drives and rotating the inserted disk at increasing rotational speeds up to an operating rotational speed at which reading or recording ensues;
  while increasing the rotational speed of the inserted disk, calibrating the one disk drive to operate with the inserted disk; and
  substantially simultaneously to performing the above two steps in said one disk drive, performing said two steps in a predetermined plurality of said disk drives after any one of said disks is inserted into respective ones of said predetermined plurality of said disk drives.

19. In the machine-effected method set forth in claim 18 further including the machine-executed steps of:
  selecting all of the disks in the media library to be optical disks;
  selecting said disk drive to be an optical disk drive and inserting an optical disk into any one of the drives;
  shining a light beam onto the disk for reading and recording signals from and on disk;
  during said calibrating the disk drive step, first calibrating the focus of said any one optical disk drive, then, upon completing the focus calibration, calibrating the tracking of the optical disk drive.

20. In the machine-effected method set forth in claim 19 further including the machine-executed steps of:
  during said calibrating step radially dithering the light beam.

21. In the machine-effected method set forth in claim 20 further including:
  effecting a predetermined number of dither cycles;
  measuring the calibration in each dither cycle; and
  analyzing the measurements to obtain a final calibration value.

* * * * *